United States Patent [19]

Jensen et al.

[11] 4,404,729

[45] Sep. 20, 1983

[54] MULTI-SPINDLE MACHINE TOOLS

[75] Inventors: Niels D. Jensen, Bjerringbro, Denmark; Arne Johansen, Fahrenkrug, Fed. Rep. of Germany

[73] Assignee: Grundfos Pumpenfabrik GmbH, Wahlstedt, Fed. Rep. of Germany

[21] Appl. No.: 319,918

[22] Filed: Nov. 10, 1981

[30] Foreign Application Priority Data

Nov. 12, 1980 [DE] Fed. Rep. of Germany ....... 3042564

[51] Int. Cl.³ ............ B23Q 3/157

[52] U.S. Cl. ............ 29/568

[58] Field of Search ............ 29/568, 26 A, 26 R, 29/563, 564, 27 R

[56] References Cited

U.S. PATENT DOCUMENTS

| | | | |
|---|---|---|---|
| 2,630,026 | 3/1953 | Monson | 29/26 R X |
| 4,110,898 | 9/1978 | Yamaoka et al. | 29/568 |

FOREIGN PATENT DOCUMENTS

| | | | |
|---|---|---|---|
| 1931559 | 12/1970 | Fed. Rep. of Germany | 29/568 |
| 2031219 | 1/1971 | Fed. Rep. of Germany | 29/568 |
| 2907995 | 11/1979 | Fed. Rep. of Germany | 29/568 |
| 55-144945 | 11/1980 | Japan | 29/568 |
| 602341 | 4/1978 | U.S.S.R. | 29/568 |

*Primary Examiner*—William R. Briggs

*Attorney, Agent, or Firm*—Bell, Seltzer, Park and Gibson

[57] ABSTRACT

This invention relates to multi-spindle machine tools of the kind comprising a plurality of tool-carrying spindle heads stored in at least one magazine, said spindle heads being exchangeable as desired for the purpose of performing a tool change, a selected spindle head in the magazine being substituted for the one currently secured to the spindle head carrier, this latter spindle head being released from the carrier and conveyed to its predetermined storage space in the magazine, whereas the other spindle head selected in each case is withdrawn from the magazine and secured to the spindle head carrier.

According to this invention, the spindle head carrier is constructed as a turret rotatable around a longitudinal axis and is provided with spindle head holders distributed along its outer periphery. Each magazine laterally co-ordinated with the turret has storage spaces for the spindle heads which are to be stored, the holders and the storage spaces being located at identical radial distances from the longitudinal axis. For the purpose of reciprocal transfer of spindle heads the holders are placeable in alignment by rotation of the turret, and each holder of the turret is turnable to an operating position in which the spindle head present in the holder in question is couplable to a spindle drive system stationarily arranged on the magazine.

6 Claims, 4 Drawing Figures

1
2
3
4
5
6
7
8
9
11
12
13
14
16
17
18
19
22

11
12
17
20, 21
16
18
19
3
9a
9
30
7
2
30

A
4
26
23
24
C
25
28
27
H
29
8
B
1

MULTI-SPINDLE MACHINE TOOLS

BACKGROUND OF THE INVENTION

The present invention relates to multi-spindle machine tools of the kind comprising a plurality of tool-carrying spindle heads stored in at least one magazine, said spindle heads being exchangeable as desired for the purpose of performing a tool change, a selected spindle head in the magazine being substituted for the one currently secured to the spindle head carrier, this latter spindle head being released from the carrier and conveyed to its predetermined position in the magazine, whereas the other spindle head selected in each case is withdrawn from the magazine and secured to the spindle head carrier. Hereinafter, such a machine tool will be referred to as "of the kind described."

Arising out of the problem of keeping idle periods and thus production periods as short as possible, it is of decisive importance among other considerations in the case of machine tools of this nature, to replace the spindle head currently on the carrier in the operating position with another for the next machining operation as rapidly as possible.

This period required for tool change-over primarily also depends on the nature and operation of the magazines storing the spindle heads. Most of the conventional magazines fundamentally comprise a storing conveying track on which the magazines are installed in recumbent or suspended position, in series and/or mutually parallel. An arrangement in series presupposes that the sequence of the spindle heads which must be held available in the magazine is mandatorily tied to the sequence of the different machining operations. On the other hand, a magazine system in which the spindle heads may optionally be selected individually and recalled as required, is somewhat more flexible.

In this system comprising a series and parallel arrangement of the spindle heads and furthermore in the case of all other known spindle head magazines, it is irksome that wherever it is required to change a spindle head not only the two spindle heads actually taking part in the operation, but either all or at least more than two spindle heads must be displaced, placed in new positions and even regrouped in certain instances. This brings about certain disadvantages or difficulties in that upon replacing tools, the next spindle head must normally be deflected from a horizontal trajectory in the magazine into a vertical trajectory towards the carrier, whereas the spindle head which is to be replaced must describe an oppositely directed trajectory beforehand or even simultaneously. It will be understood that directional changes of this kind require comparatively complex and expensive guiding and conveying means for the spindle heads which are to be so displaced, and that in view of the considerable distance to be travelled between the spindle head support on the spindle head carrier and the magazine storage points in question, some consideration time will be taken up to carry out a tool change, which has an unfavourable effect because it is an unused idle period.

It is an object of the invention to provide a multi-spindle machine tool which speeds up tool changing and in an uncomplicated manner without having to displace more than two spindle heads. It is a further object to make the distances between the storage points and the support of the spindle head carrier extremely short and to make it possible to enable the transfer of the spindle heads from the magazine to the carrier and vice versa to be made along straight trajectories and consequently with uncomplicated driving and guiding means.

SUMMARY OF THE INVENTION

To achieve these and other objects, in a machine tool of the kind described, the invention consists in that the spindle head carrier is constructed as a turret rotatable around a longitudinal axis and is provided with spindle head holders distributed along its outer periphery, each said magazine laterally co-ordinated with said turret having storage points for the spindle heads which are to be stored, said holders and said storage points being located at identical radial distances from said longitudinal axis and, for reciprocal transfer of spindle heads being placeable in alignment by rotation of said turret, and wherein each said holder of said turret is turnable to an operating position in which said spindle head present in said holder in question is couplable to a spindle drive which is stationarily arranged on said magazine.

In a machine tool in accordance with the invention, the turret acting as a spindle head carrier which is now actually merely a carrier lacking the otherwise incorporated drive for the spindle head carried by it, may have any of its peripherally situated holders brought into alignment in accordance with a definite programme and by a simple rotary displacement with any optional empty storage point of the adjacent magazine in order to deposit the spindle head which is to be replaced at said point, and may moreover have any one of its holders brought into alignment with another optional storage point occupied by a spindle head, in order to take over the spindle head from said storage point, in order thereupon to place this spindle head in the operating position by rotation.

Since all the holders and storage points are positioned at identical radial distances from the longitudinal axis of the machine and from the axis of rotation of the turret, and may have the ends which are adjacently situated in each case placed in alignment for insertion and withdrawal of the spindle heads, the spindle heads need merely be displaced along short straight paths during their mutual transfer.

All the spindle head holders and storage points of the turret and magazine appropriately have guiding and securing elements extending parallel to the said longitudinal axis, which may be placed in form-locked engagement with corresponding mating elements of the spindle heads present in the holders and storage points respectively, with the result that for the purpose of transfer from the magazine to the turret and vice versa, the spindle heads need merely be displaced axially parallel by means of a driving mechanism.

BRIEF DESCRIPTION OF THE DRAWINGS

In order that the invention may be more clearly understood, reference will now be made to the accompanying drawings, which show one embodiment thereof by way of example, and in which.

DETAILED DESCRIPTION OF THE PREFERRED EMBODIMENT

Figure 1:
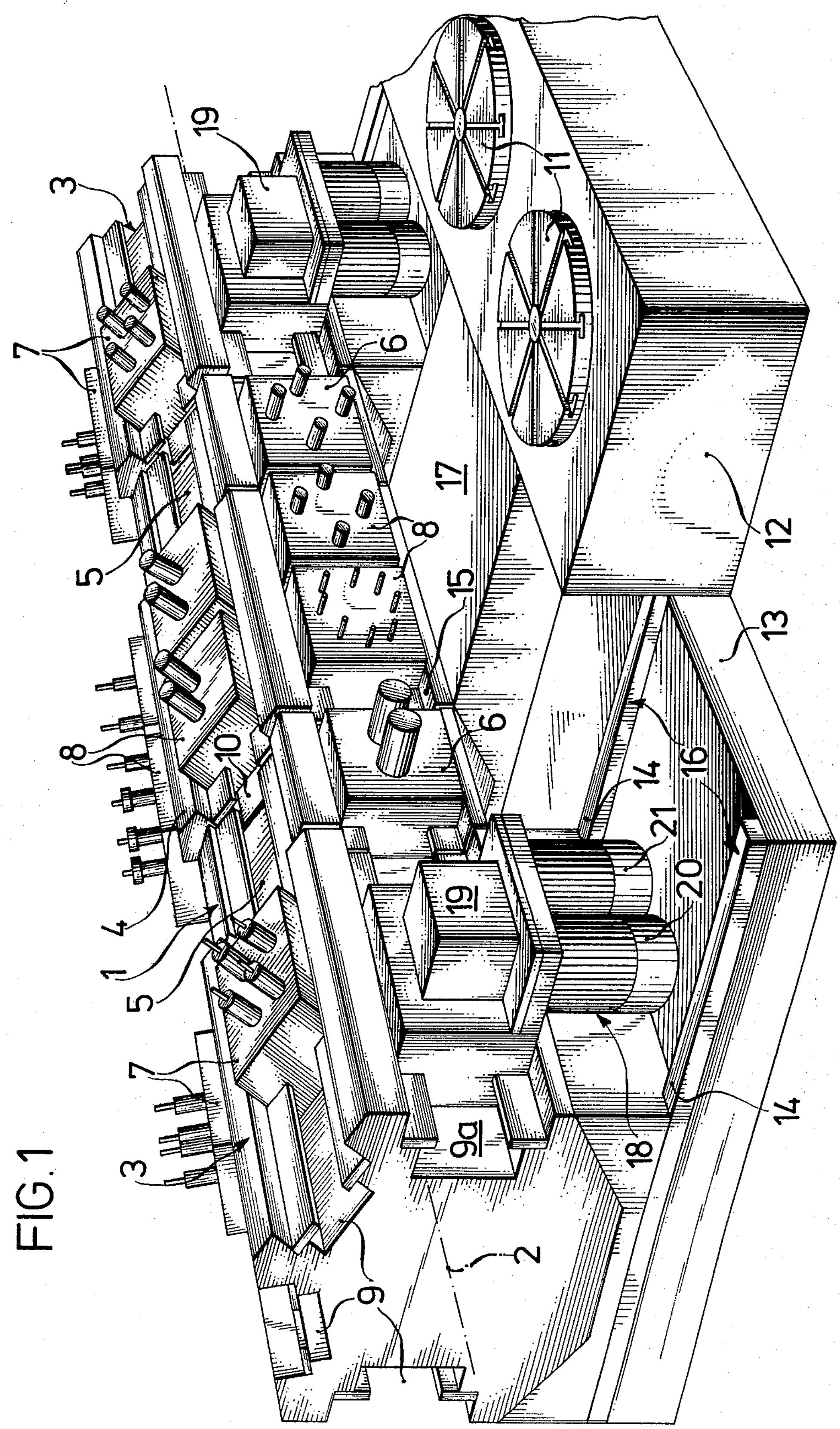
FIG. 1 shows a view in perspective of a machine tool in accordance with the invention.

Referring now to the drawings, in this embodiment, the machine tool illustrated is fitted with two turrets and two magazines laterally co-ordinated with each turret. Since both systems are of fundamentally identical construction, and are also identical in function, it is only the machine system which is at the left according to FIGS. 1 and 2 which will be described in particular in the following.

Said system comprises a turret 1 which is arranged to be driven in rotation around a longitudinal axis 2. The driving spindle of the turret, which is not illustrated, extends along the longitudinal axis 2 and is journalled in two lateral magazines 3 and 4. The turret 1 has four holders 5, for example, for spindle heads and in accordance with the illustration is occupied by a spindle head 6 situated in the operating position.

Other spindle heads 7,8 are present in the magazines 3 and 4 situated at the left and right beside the turret 1, that is to say at storage points 9 and 10, each magazine having a total of such storage points. As for the rest, the holders 5 and the storage points 9,10 are positioned at identical radial distances from the longitudinal and turret axis 2 and, as apparent from FIG. 2, having guiding and securing elements extending parallel to the said axis and in the form of grooves and projections which may be placed in form-locked engagement with corresponding mating elements of the spindle heads, so that the spindle heads need merely be displaced axially parallel by means of a driving mechanism for transfer from the magazine to the turret and vice versa. The driving mechanisms in question intended for this displacing motion may for example comprise a toothed rack and a pinion in mesh therewith, which is driven hydraulically or electrically, as will now be described.

The workpiece which is to be machined is installed on the mounting 11 such as a face-plate in conventional manner, said mounting being secured on a stationary bracket 12 in this particular embodiment. The spindle head carrier or turret 1 should consequently be displaceable together with its spindle head 6 in the direction towards the stationary workpiece and back after the machining operation, in a machine of this kind. To this end, the magazine 3 together with the turret 1 is displaced as a movable unit by means of a driving mechanism and an appropriate guide system. Commensurately stable and precisely operating guiding means should be provided in view of the comparatively great weight of this unit.

Figure 2:
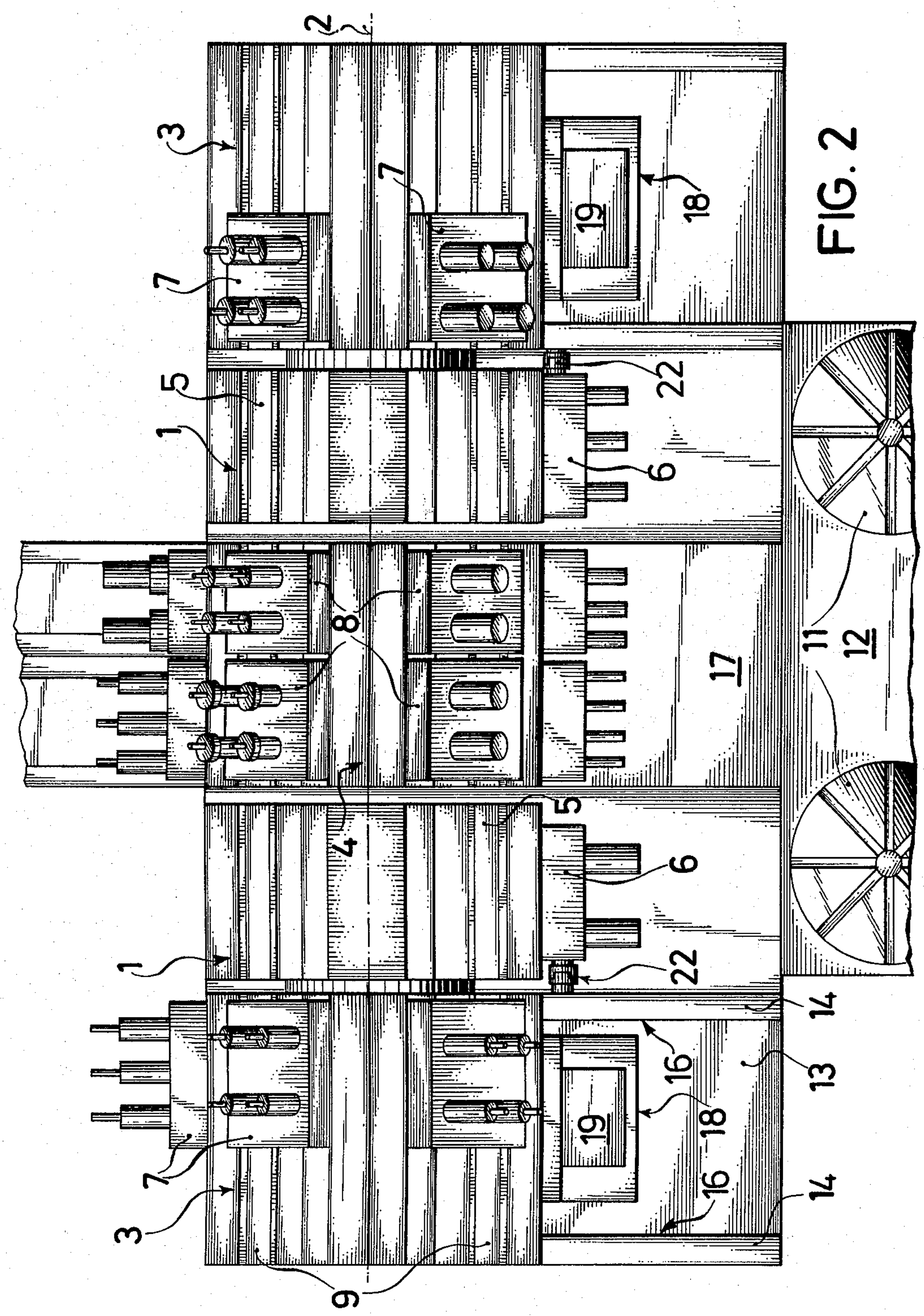
FIG. 2 shows a plan view of the machine according to FIG. 1.

As apparent primarily from FIG. 1, the magazines 3,4 are provided with comparatively wide guiding surfaces 14,15 in the area of their lower support on the bracket 13, said surfaces lying on guiding rails 16 or on guiding surfaces 17. These guiding means are so arranged that the unit formed by the turret 1 and at least one of the magazines 3,4 may be displaced as a carriage transversely to the longitudinal axis 2.

The driving system 18 for the spindle head 6 situated in the operating position in each case may for example be installed in the forwardly directed storage space 9*a* of the magazine 3. It comprises the housing 19 which has two electric motors 20, 21 connected to it via flanges. If need be, a transmission and back gear are installed in the housing. Two motors 20,21 are incorporated so that two tool sets appertaining to one spindle head may be driven at different rotational speeds.

A clutch 22 is incorporated between the output end of the two motors 20,21 and the input extremity of the spindle head 6 situated in the operating position, which couples the said spindle head drives to the corresponding spindle head as soon as the same had been turned with the turret 1 into the operating position shown in FIG. 1. The clutch should then be operated and freed to perform a tool replacement, so that the spindle head 6 may be withdrawn from the operating position by rotation of the turret 1 and may be carried into an empty storage space of one of the two magazines 3,4. The turret could remain in this position to receive the spindle head required for the next machining operation, if one of its unoccupied holders aligned on a storage space containing the spindle head required. The turret would otherwise have to be displaced by one or more additional rotary steps and should, after transfer of the spindle head required, be turned onwards so far that the latter will reach the operating position. The coupling connection 22 is then established thereat between the drives 20,21 and the spindle head, so that the next machining operation may be initiated.

To shorten the idle periods caused by tool replacement, the actions described should be initiated as soon as the tools of the operating spindle head have been freed from or out of the workpiece and as soon as the turret 1 may be turned freely with its spindle head. Since the magazine 3 comprising the driving system 18 accompanies the return displacement of the turret 1 at the same time and in the same direction, the turret may consequently already travel during this displacement to an unoccupied storage space of this magazine for its spindle head, deposit the spindle head and may after any continued rotation which may be required approach the storage space occupied by the spindle head required. After receiving the new spindle head and turning the latter to the operating position, the unit comprising the turret and the lateral magazine 3 is finally displaced again in the direction towards the workpiece.

Figure 4:
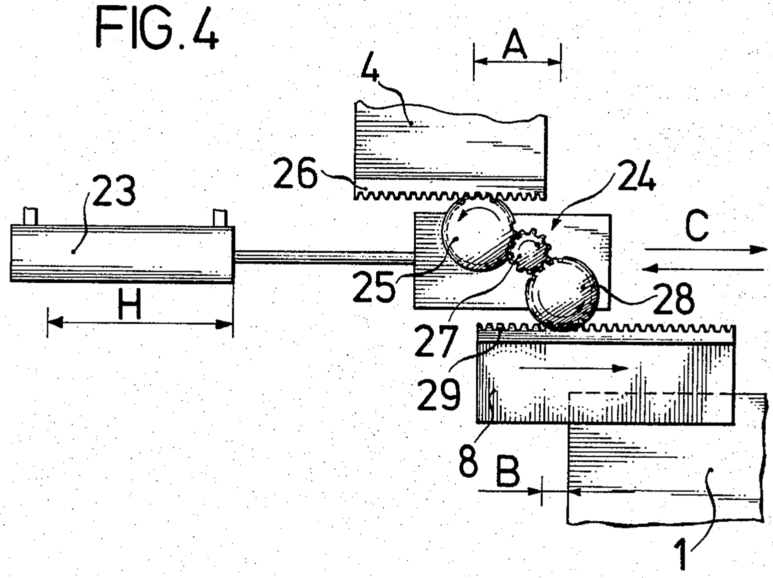
FIG. 4 shows a diagrammatical illustration of a displacing drive.

If little space is available for the other magazines 4 in their width, i.e. in the direction of the longitudinal axis 2, for installing a drive comprising a hydraulic cylinder in essence and intended for axially parallel displacement of the spindle heads from the magazines 4 into the turret 1 and vice versa, since its stroke is insufficient by itself to overbridge the longer path of displacement of the spindle heads, a driving system according to FIG. 4 is incorporated, which is illustrated in diagrammatic form.

Apart from a double-acting hydraulic cylinder 23, a driving system of this nature comprises a transmission gear 24 displaced parallel to the longitudinal axis 2 by said cylinder, whereof the first gearwheel 25 meshes with a stationary toothed rack 26 on the magazine 4, so that this gearwheel rotates according to the arrow depicted, when the gear is displaced along the feed direction C. The gearwheel 25 transmits its rotary motion via an intermediate gear 27 to another gearwheel 28, so that the gearwheels 25 and 28 rotate equidirectionally. The other gearwheel 28 co-operates with a toothed rack 29 of the spindle head 8 which is just scheduled to be fed in or to be deposited in the storage space, in such manner that after completion of the displacing action, it may be withdrawn from the toothed rack 28 or be placed in engagement therewith, that is to say by axial displacement along its axis of rotation. The other gearwheel 28 is situated in front of the first gearwheel 25 in the direction of feed C, as clearly apparent from FIG. 4. Each storage space of each magazine 4 is provided with a driving system of this nature.

This construction of the driving system results in an algebraic summation of the transverse displacement of the transmission gear as a consequence of the displacement stroke H of the hydraulic cylinder 23 and of the transverse displacement of the spindle head which is engendered by the gearwheels 25,27 and 28 in conjunction with the toothed racks 26 and 29. It is possible thereby to displace the spindle head axially along a greater distance than allowed by the stroke H based on lack of space. The axial gap B between the magazine 4 and the spindle head carrier or turret 1 may thus be overbridged, if this is not feasible because of too short a possible stroke H.

Figure 3:
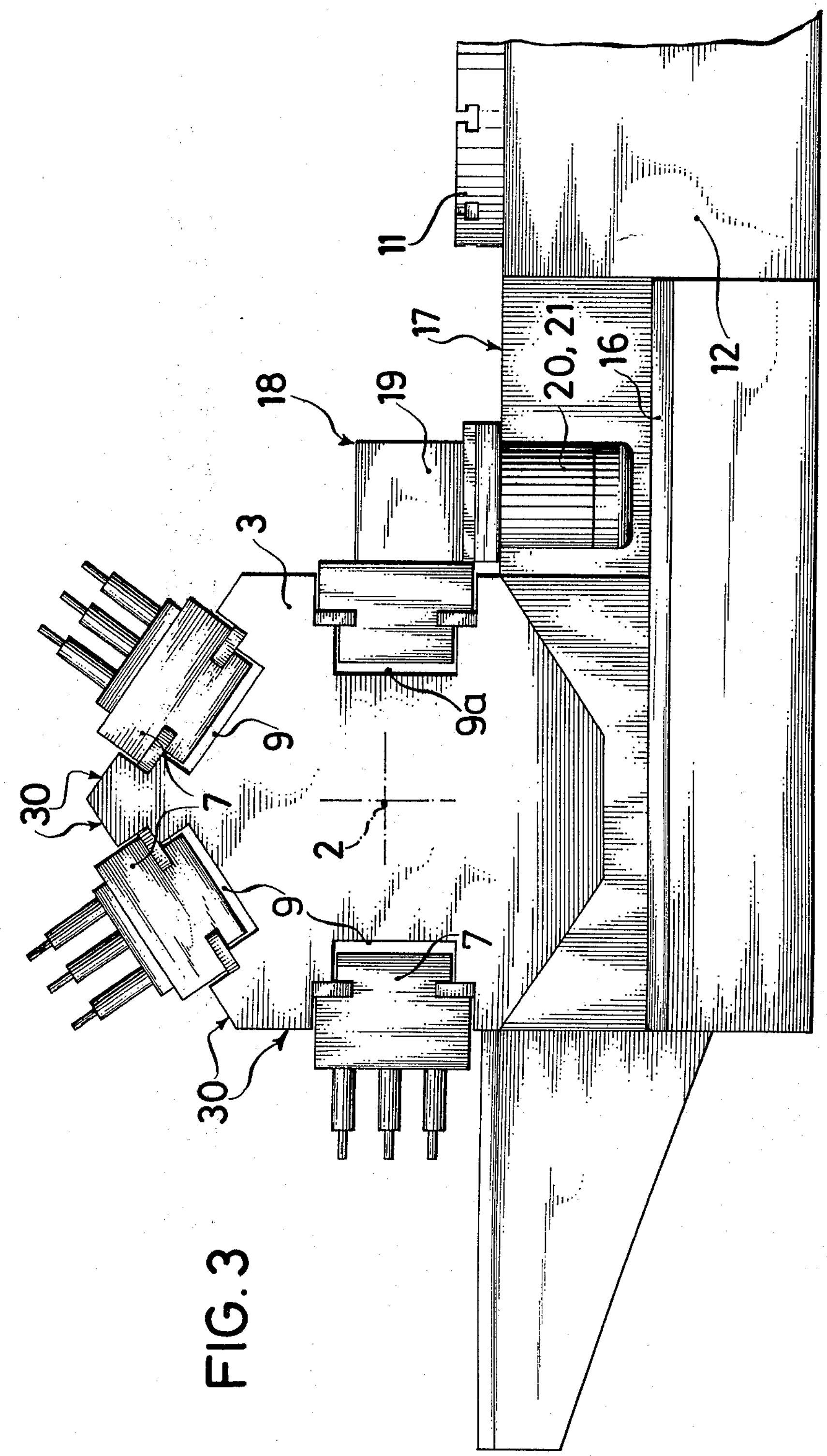
FIG. 3 shows an end view of the same took.

On the score of simpler functional elucidation, the driving system according to FIG. 4 corresponding to its illustration therein, is shown simplified in schematic form. From the constructional point of view, one skilled in the art will be able to produce compact embodiments in accordance with this principle, without additional information. The point at which the system according to FIG. 4 may be situated is marked 30 in FIG. 3.

We claim:

1. In a multi-spindle machine tool of the kind comprising a plurality of tool-carrying spindle heads stored in at least one magazine, said spindle heads being exchangeable as desired for the purpose of performing a tool change, a selected spindle head in the magazine being substituted for the one currently secured to the spindle head carrier, this latter spindle head being released from the carrier and conveyed to its predetermined storage space in the magazine, whereas the other spindle head selected in each case is withdrawn from the magazine and secured to the spindle head carrier, the invention which consists that said spindle head carrier is constructed as a turret rotatable around a longitudinal axis and is provided with spindle head holders distributed along its outer periphery, each said magazine laterally co-ordinated with said turret having storage spaces for the spindle heads which are to be stored, said holders and said storage spaces being located at identical radial distances from said longitudinal axis and, for the purpose of reciprocal transfer of spindle heads being placeable in alignment by rotation of said turret, and wherein each said holder of said turret is turnable to an operating position in which said spindle head present in said holder in question is couplable to a spindle drive system stationarily arranged on said magazine.

2. A machine tool according to claim 1, wherein all said spindle head holders and storage spaces within said turret and said magazine respectively, have guiding and securing elements extending parallel to said longitudinal axis, which are engageable in form-locked relationship with corresponding mating elements of said spindle heads present in said holders and storage spaces respectively, and wherein said spindle heads are displaceable in axially parallel direction by means of a driving system for the purpose of transfer from said magazine to said turret and vice versa.

3. A machine tool according to claim 1, wherein one magazine is situated at either side of said turret in each case.

4. A machine tool according to claim 1, wherein said turret has at least the number of said holders which is identical to the number of said storage spaces of a said magazine.

5. A machine tool according to claim 1, wherein said turret and each said magazine co-ordinated therewith form a structural unit in respect of the relative displacement between said turret and a workpiece which is to be machined, and are conjointly displaceable.

6. A machine tool according to claim 2, wherein said driving systems for axially parallel displacement of said spindle heads each comprise a transmission gear which is transversely displaceable by a double-acting hydraulic cylinder, said transmission having a first gearwheel in meshing engagement with a first stationary toothed rack on said magazine, and wherein a second gearwheel positioned in front of said first toothed rack in the feed direction of said spindle head into said turret is engageable in and disengageable from a second toothed rack on said spindle head in question, to entrain the same under generation of an intrinsic transverse displacement which is added algebraically to the aforesaid transverse displacement.

* * * * *